US006957110B2

(12) United States Patent
Wewalaarachchi et al.

(10) Patent No.: US 6,957,110 B2
(45) Date of Patent: Oct. 18, 2005

(54) METHOD AND APPARATUS FOR AUTOMATICALLY GENERATING A SCADA SYSTEM

(75) Inventors: Bandu Wewalaarachchi, Singapore (SG); Pramond V. Bhave, Singapore (SG)

(73) Assignee: Eutech Cybernetics (SG)

( * ) Notice: Subject to any disclaimer, the term of this patent is extended or adjusted under 35 U.S.C. 154(b) by 155 days.

(21) Appl. No.: 09/970,028

(22) Filed: Oct. 4, 2001

(65) Prior Publication Data

US 2002/0193888 A1 Dec. 19, 2002

(51) Int. Cl.⁷ ............................................. G05B 19/42
(52) U.S. Cl. .......................... 700/86; 700/17; 700/19; 700/83
(58) Field of Search ..................... 700/17–19, 23–25, 700/83, 86, 87, 97; 703/24

(56) References Cited

U.S. PATENT DOCUMENTS

| | | | | |
|---|---|---|---|---|
| 4,885,694 A | * | 12/1989 | Pray et al. .................. | 705/400 |
| 5,297,022 A | * | 3/1994 | Watanabe .................... | 700/86 |
| 5,812,394 A | * | 9/1998 | Lewis et al. ................. | 700/17 |
| 5,819,062 A | * | 10/1998 | Srikantappa ................. | 716/11 |
| 5,933,638 A | * | 8/1999 | Cencik ....................... | 717/131 |
| 6,061,604 A | * | 5/2000 | Russ et al. ................... | 700/90 |
| 6,067,477 A | | 5/2000 | Wewalaarachchi et al. ... | 700/83 |
| 6,088,624 A | * | 7/2000 | Khan et al. .................. | 700/86 |
| 6,298,474 B1 | * | 10/2001 | Blowers et al. .............. | 717/104 |
| 6,463,343 B1 | * | 10/2002 | Emens et al. ................ | 700/83 |
| 6,529,936 B1 | * | 3/2003 | Mayo et al. ................. | 709/202 |
| 6,643,555 B1 | * | 11/2003 | Eller et al. .................. | 700/83 |

* cited by examiner

Primary Examiner—John Follansbee
Assistant Examiner—Aaron Perez-Daple
(74) Attorney, Agent, or Firm—Morrison & Foerster LLP

(57) ABSTRACT

A method for automatically configuring a supervisory control and data acquisition (SCADA) system using an as-built drawing. The electronic as-built file is scanned for devices selected from a menu. A list is compiled of selected devices, including location and relational information for each device. Selected graphical information from the electronic as-built file is then converted into a preferred SCADA graphical user interface.

5 Claims, 3 Drawing Sheets

```
  0                  1                 40         $DIMSHO              9
SECTION              9                 0.0        70                   $DIMTFAC
  2                  $DRAGMODE         9            1                  40
HEADER               70                $DIMDLE    9                    1.0
  9                  2                 40         $DIMPOST             9
$ACADVER             9                 0.0          1                  $DIMGAP
  1                  $LTSCALE          9          9                    40
AC1014               40                $DIMEXE    $DIMAPOST            0.09
  9                  1.0               40           1                  9
$ACADMAINTVER        9                 0.18       9                    $DIMJUST
  70                 $OSMODE           9          $DIMALT              70
    0                70                $DIMTP     70                     0
  9                    0               40           0                  9
$DWGCODEPAGE         9                 0.0        9                    $DIMSD1
  3                  $ATTMODE          9          $DIMALTD             70
ANSI_1252            70                $DIMTM     70                     0
  9                  1                 40           2                  9
$INSBASE             9                 0.0        9                    $DIMSD2
  10                 $TEXTSIZE         9          $DIMALTF             70
1516.622642          40                $DIMTXT    40                     0
  20                 0.317432          40         25.4                 9
1295.73176           9                 0.18       9                    $DIMTOLJ
  30                 $TRACEWID         9          $DIMLFAC             70
0.0                  40                $DIMCEN    40                     1
  9                  0.05              40         1.0                  9
$EXTMIN              9                 0.09       9                    $DIMTZIN
  10                 $TEXTSTYLE        9          $DIMTOFL             70
141.789076           7                 $DIMTSZ    70                     0
  20                 ROMANS            40           0                  9
156.44704            9                 0.0        9                    $DIMALTZ
  30                 $CLAYER           9          $DIMTVP              70
0.0                  8                 $DIMTOL    40                     0
  9                  FIRE-INT          70         0.0                  9
$EXTMAX              9                   0        9                    $DIMALTTZ
  10                 $CELTYPE          9          $DIMTIX              70
2384.665745          6                 $DIMLIM    70                     0
  20                 BYLAYER           70           0                  9
2167.315869          9                   0        9                    $DIMFIT
  30                 $CECOLOR          9          $DIMSOXD             70
108.0                62                $DIMTIH    70                     3
  9                  256               70           0                  9
$LIMMIN              9                   1        9                    $DIMUPT
  10                 $CELTSCALE        9          $DIMSAH              70
0.0                  40                $DIMTOH    70                     0
  20                 1.0               70           0                  9
0.0                  9                   1        9                    $DIMUNIT
  9                  $DELOBJ           9          $DIMBLK1             70
$LIMMAX              70                $DIMSE1      1                  2
  10                   1               70         9                    $DIMDEC
3456.0               9                   0        $DIMBLK2             70
  20                 $DISPSILH         9            1                  4
2304.0               70                $DIMSE2    9                    $DIMTDEC
  9                    0               70         $DIMSTYLE            70
$ORTHOMODE           9                   0        2                    4
  70                 $DIMSCALE         9          STANDARD             9
    1                40                $DIMTAD    9                    $DIMALTU
  9                  1.0               70         $DIMCLRD             70
$REGENMODE           9                   0        70                   2
  70                 $DIMASZ           9            0                  9
    1                40                $DIMZIN    9                    $DIMALTTD
  9                  0.18              70         $DIMCLRE             70
$FILLMODE            9                   0        70                   2
  70                 $DIMEXO           9            0                  9
    1                40                $DIMBLK    9                    $DIMTXSTY
  9                  0.0625              1        $DIMCLRT             7
$QTEXTMODE           9                 9          70                   STANDARD
  70                 $DIMDLI           $DIMASO      0                  9
    0                40                70                              $DIMAUNIT
  9                  0.38                1                             70
$MIRRTEXT            9                 9
  70                 $DIMRND
```

Fig. 3

METHOD AND APPARATUS FOR AUTOMATICALLY GENERATING A SCADA SYSTEM

FIELD OF THE INVENTION

The invention relates to supervisory control and data acquisition (SCADA) systems generally. More particularly, the invention relates to a method and apparatus for automatically generating and configuring a SCADA system using electronic "as-built" data files.

BACKGROUND OF THE INVENTION

Computerized systems for monitoring, diagnosing, operating and controlling the operations of a wide variety of facilities, including factories, power plants, warehouses, office buildings and apartment buildings, are known. In such Supervisory Control and Data Acquisition (SCADA) systems, microprocessor devices convert device measurement and status inputs into computer data for logging and transmission to higher level processors. These supervisory processors make strategic decisions for the operation of a subsystem or subsystem device and send out set points to dedicated controllers which will make the changes to actuators and ultimately the process. The SCADA network therefore connects to many controllers and field devices to gather information and make global decisions. These SCADA systems typically integrate a large number of control devices through a number of diverse control networks. For example, there may be security, fire protection, heating, cooling, electrical and elevator control systems. U.S. Pat. No. 6,067,477 describes a method and an apparatus for providing an object-oriented frame work for the development of personalized workflow applications that provide real time SCADA functionality, while maintaining scalability to any number of users and integration with existing applications and systems. More specifically, U.S. Pat. No. 6,067,477 describes a computer integrated SCADA system for managing distributed field devices that control or monitor physical or logical entities and for providing users the ability to construct personalized SCADA applications. The computer controlled system provides real time continuous operational control by monitoring data received from one or more remote device sensors and actuating at least one of the plurality of control devices based on input from said remote sensors.

When a process control system is first installed, the system must be configured to function properly. However, configuring a process control system can be a complex, error prone task in which the user is required to keep track of numerous operations, files, computer connections and software configurations for all devices in the system. Typically, a user configures such a system from a written description (e.g., in system manuals) that identifies the features that can be configured and specifies the procedure for configuring the features (and, sometimes, the order in which the features are to be configured). The user types in commands based on instructions in the manual to configure such features as the data paths that the SCADA system will use, alarm conditions, network specifications, etc. In general, the user is required to type in the applicable information for each feature. The user typically keeps track of the features that have been configured, e.g., proceeding through a written checklist that he or she constructs or that the manuals provide. According to a more advanced method for configuring systems, there exist graphics-driven techniques according to which a user can configure the data processing features of a SCADA system. According to this method, the configurable data processing features are represented by displayed graphical objects that the user can readily comprehend and associate with each data processing feature. Symbols are created and added to the display for at least some of the configured features to present the user with a pictorial view of the features that have been configured. The user selects a displayed graphical object using an input device of the computer and is prompted to enter information associated with the data processing feature represented by the object. The computer system is enabled to thereafter use the data processing feature to process data in accordance with the entered information. However, even such graphics-driven methods for configuring SCADA systems are complex and time-consuming. Accordingly, there exists a need for an automated method for generating and configuring SCADA systems.

SUMMARY OF THE INVENTION

This invention is a method of using electronic copies of as-built drawings to automatically generate and configure a SCADA system. "As-built" drawings are often prepared at the conclusion of a construction project and reflect the final location of floors, walls, and building systems and devices and their connections. As-built factory drawings may also show the location of installed machinery, for example. As-built drawings are typically, but not necessarily, based on building and/or system blueprints which are modified following inspection of the final facility and notation of the location and connections of the structure and devices. Once prepared, as built drawings are often stored electronically in a graphics format such as DXF and the like.

According to the invention, there is provided a method for reading an electronic copy of an as-built drawing, compiling a list of objects represented in the as-built drawing file and converting the graphical representation of the systems and devices represented in the as-built drawing to a graphical format according to the requirements of the SCADA system to be configured for use as a background drawing. According to the invention, the format conversion may be proceeded by a filtering step in which systems or "layers" represented in the as-built file may be filtered out or de-selected for conversion. Also according to the invention, the list of objects compiled from the as-built drawing may include list of all devices and systems represented in the as-built drawing, or it may be a list of only pre-selected categories of devices and systems represented in the as-built drawing. Compilation of the list of objects from the as-built drawing preferably includes identification of location information and relational information for each device selected for the device list and association of said location and relational information in memory to the corresponding device and/or devices, so-called binding addresses. Specifically, each object is associated, or "bound" to a corresponding subsystem and to a device address. Since each subsystem often has its own addressing scheme for devices, by combining subsystem and device address, a unique binding address is made. For example, a particular thermostat might be assigned the unique binding address "HVAC_1.DEVICE_001." Optionally, this unique binding address may be renamed or mapped to an application specific object such as "Floor1.Room1.Temperature."

Once the list and associated location and relational information is compiled from the as-built file and stored in the SCADA system memory, and the as-built drawing's graphical representation has been filtered, converted and stored in the SCADA system memory, the generation of active screens in response to inputs from a system requiring attention or in response to a user command, takes place in a known fashion.

BRIEF DESCRIPTION OF THE DRAWINGS

FIG. 3 is an excerpt from a printout of a representative as-built drawing file in DXF format.

DETAILED DESCRIPTION OF THE PREFERRED EMBODIMENTS OF THE INVENTION

Figure 1:
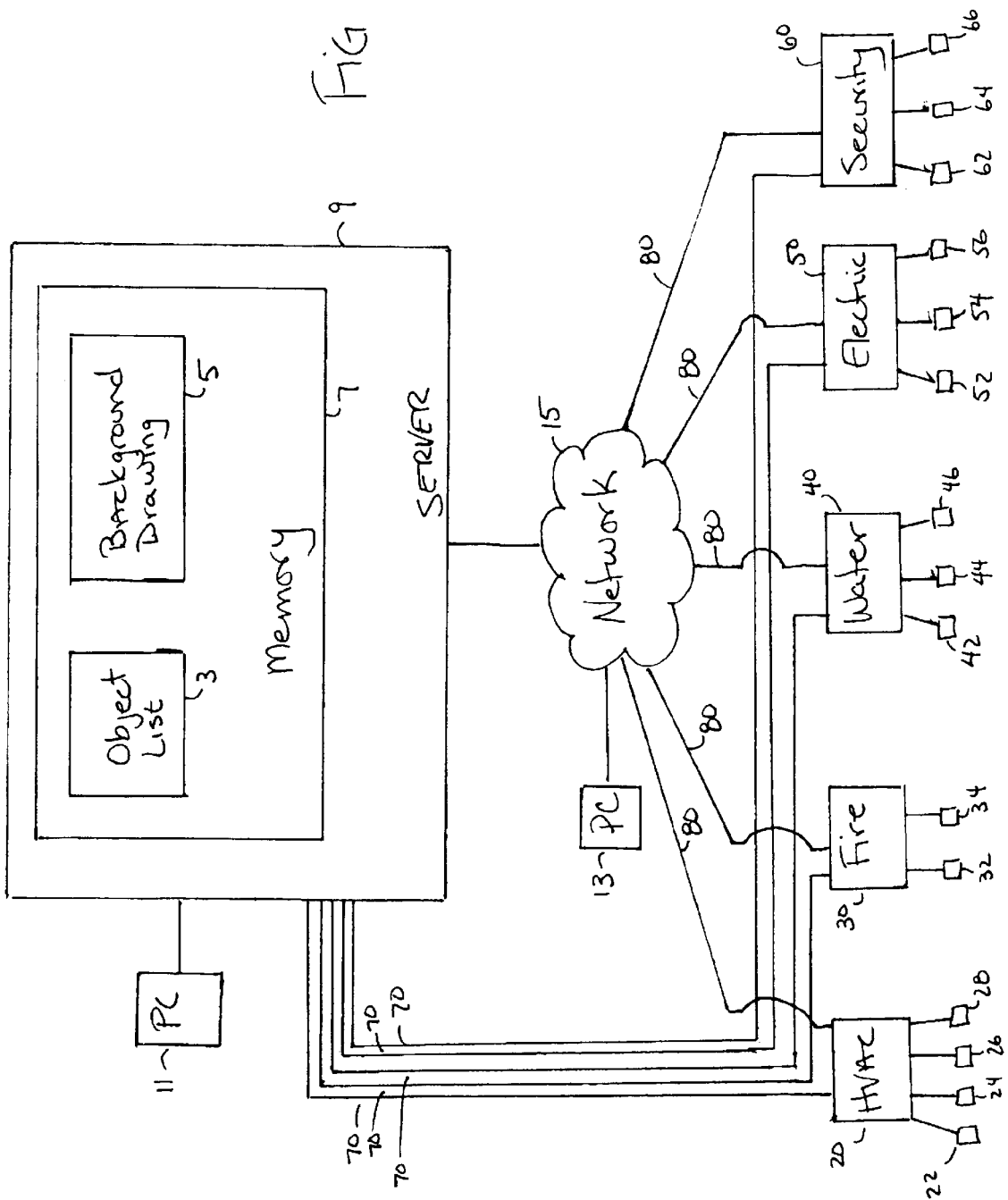
FIG. 1 is a representation of a SCADA system according to the invention.
Figure 2:
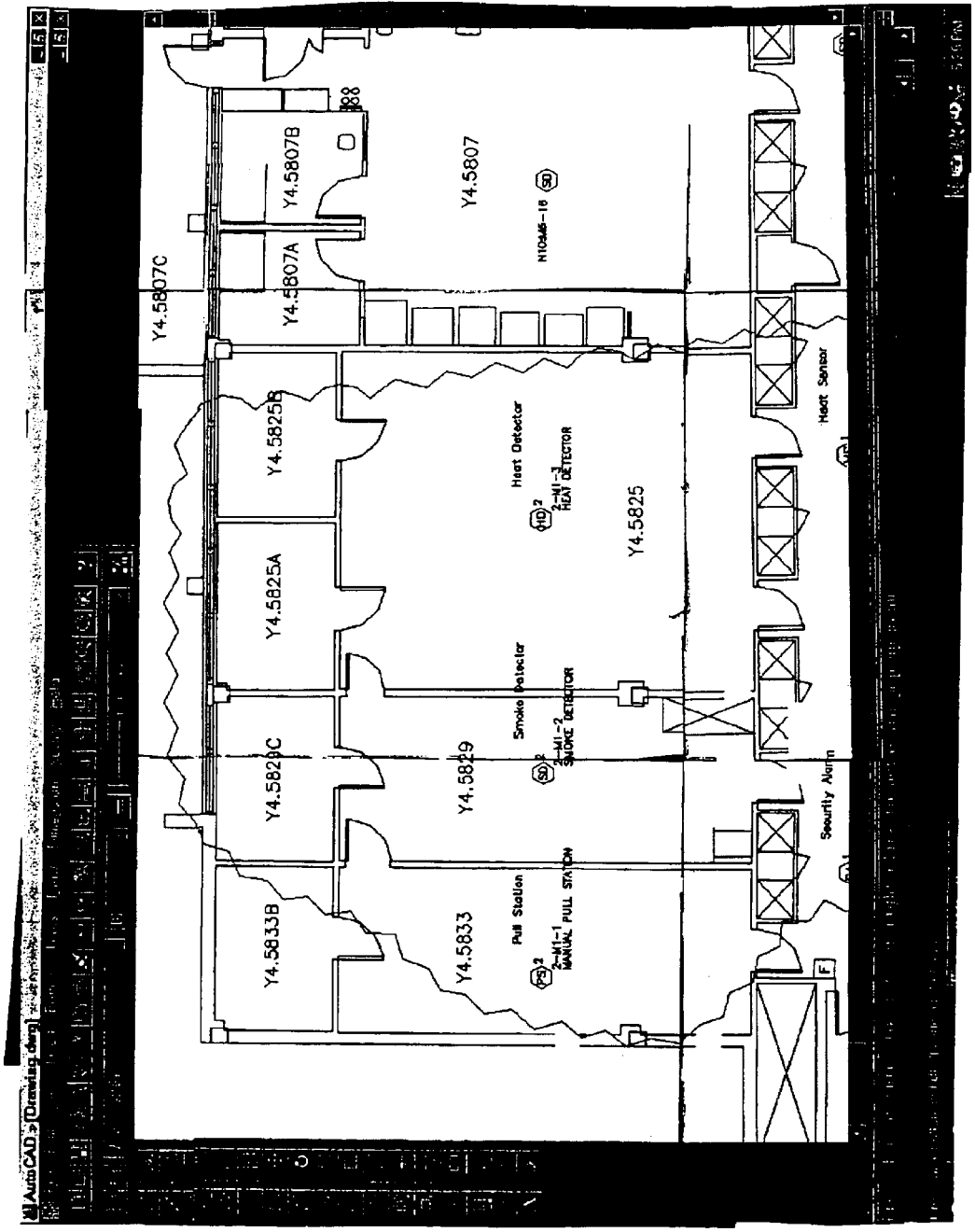
FIG. 2 shows a portion of a representative as-built drawing.

Referring to FIG. 1, there is shown a SCADA system 1 including object list 3 and background drawing 5 stored in memory 7. SCADA system 1 may be maintained on a server 9, and server 9 may be hard-wired to PC 11 and/or it may be in communication with remote PC 13 by the internet 15. Server 9 may itself optionally be a personal computer.

HVAC control system 20, fire control system 30, water control system 40, electrical control system 50 and security system 60 receive and optionally store data from corresponding system devices. For example, HVAC control system receives, monitors and selectively stores data, for example, from thermostat 22, cooling tower 24, furnace 26 and ventilation fan 28. Fire control system 30 receives, monitors and selectively stores data from fire control devices including smoke detector 32 and sprinkler water pressure meter 34. In addition, in an integrated system, fire control system 30 may optionally receive and monitor data from thermostat 22 which may have a primary association with HVAC control system 20 but a secondary association 35 with fire control system 30. Water control system 40 may receive, monitor and optionally store data from devices including water meter 42, water pressure sensor 44 and hot water heater 46. Optionally, water control system 40 may receive, monitor and selectively store data from fire control devices, for example, sprinkler water pressure gauge 34. Water control system 40 may receive data from sprinkler pressure gauge 34 directly or through fire control system 30. Electrical control system 50 may receive, monitor and selectively store data from electrical control devices 52, 54, and 56, and security control system may receive, monitor and selectively store data from security control devices 62, 62 and 66. HVAC control system 20 fire control system 30, water control system 40, electrical control system 50 and/or security control system 60 may be hard wired 70 to server 9, or may communicate with server 9 over the internet 15 (lines 80) or by radio transmission. Typically, the SCADA system sends periodic requests to monitoring devices associated with each object for status information corresponding to the objects, and the monitoring devices corresponding to each object respond by sending status data back to the SCADA system.

The SCADA system associates data received from sub-system devices with corresponding object on the object list 3. If the data from a sub-system device is outside specified operational parameters associated with corresponding object on the object list 3, the SCADA system alerts the user to a situation that requires attention. The notice to the user may constitute a prompt to the user to execute a command that results in the generation of an active screen. Optionally, the system may be configured to notify the user by automatically generating an active screen showing the state of the device requiring attention.

The active screen is generated as is known in the art by identifying the portion of the background drawing 5 that contains a representation of the device on list 3 that requires attention, generating a graphic interface of that portion of the background drawing on the user's computer screen and showing the state of the device requiring attention on the background drawing. The user may select from a variety of zoom and windows settings for the display depending on the relative context in which he or she wishes to view the device, and the system calculates the boundaries of the requested screen in terms of physical coordinates. The system then picks up drawing elements and devices within the calculated boundary and configures the graphical interface. Using the active screen graphical interface generated by the SCADA system that reflects the device or devices requiring attention, the user may change the setting of the device, turn it on or off or simply ignore the alarm.

According to the invention, a SCADA system of the type described above may be automatically generated and configured using an electronic as-built file. Specifically, the electronic as-built drawing is first scanned for codes that correspond to specific devices or device types. Since the as-built files exist in a variety of formats, the system may be adapted to read and distinguish between these different formats. For example, if the system identifies the as-built file as being in DXF format, the system may scan the as-built file for all known DXF device codes, or, if the SCADA system to be generated is intended to monitor and control, for example, only fire control systems, the system will scan the as-built file only for DXF codes that correspond to fire control devices. The system may provide a menu of systems, devices and/or device types for which the SCADA system will be generated, and the system may scan the as-built file for DXF codes for corresponding only to the systems, devices or device types selected by the user from the menu.

When the system identifies a device in the as-built drawing file that has been selected from the menu, the device, its location and binding address is added to list 3. The as-built file is then scanned for graphical data corresponding to the systems and building environments selected by the user from the device list. Graphical data that corresponds to the devices, systems and environments selected by the user from the menu are then translated from DXF format into the customize and user friendly graphical interface of the SCADA system.

What is claimed is:

1. A computer-implemented method for automatically generating a supervisory control data acquisition system comprising:
   identifying devices on an as-built electronic data file, wherein the as-built electronic data file is an electronic representation of a drawing file showing the final location of floors, walls and building system components;
   creating and storing a list of objects that represent identified devices based on default icons defined for specified device types;
   identifying device-specific information and device relational information from the as-built electronic data file;
   configuring each stored object in the list of objects with said respective device-specific information; and
   generating a graphical user interface for control of the devices.

2. The method of claim 1 further comprising generating a graphic from the as-built electronic data file showing the relationship between selected devices.

3. The method of claim 1 where in the as-built electronic data file is in the DXF format.

4. The method of claim 1 further comprising:
   identifying a device type and a device address for a specific device from said as-built electronic data file; and
   binding the object corresponding to such specific device to said device address.

5. The method according to claim 1 further comprising using attributes of drawing elements to specify the binding address and to specify a user interface icon.

* * * * *